(12) United States Patent
Fauconnier et al.

(10) Patent No.: US 6,909,887 B2
(45) Date of Patent: Jun. 21, 2005

(54) METHOD OF CONTROLLING A CHANNEL BETWEEN A RADIO TERMINAL AND A CELLULAR RADIOCOMMUNICATION INFRASTRUCTURE, AND ACCESS NETWORK IMPLEMENTING SUCH A METHOD

(75) Inventors: Denis Fauconnier, Saint-Remy-les-Chevreuses (FR); Claire Mousset, Grande-Bretagne (FR)

(73) Assignee: Nortel Networks Limited, St. Laurent (CA)

( * ) Notice: Subject to any disclaimer, the term of this patent is extended or adjusted under 35 U.S.C. 154(b) by 733 days.

(21) Appl. No.: 09/862,062

(22) Filed: May 21, 2001

(65) Prior Publication Data

US 2002/0025820 A1 Feb. 28, 2002

(30) Foreign Application Priority Data

May 23, 2000 (FR) .......................................... 00 06561

(51) Int. Cl.[7] ................................................. H04Q 7/20
(52) U.S. Cl. ..................... 455/403; 455/410; 455/411; 455/422.1; 380/249; 380/250
(58) Field of Search ................................. 455/410, 411, 455/452.1; 380/247, 270, 281; 713/153, 161, 164, 168, 169, 171, 176

(56) References Cited

FOREIGN PATENT DOCUMENTS

| GB | 2 236 458 | 4/1991 |
| WO | WO 92/02088 | 2/1992 |
| WO | WO 93 25021 | 12/1993 |
| WO | WO 98 09458 | 3/1998 |

OTHER PUBLICATIONS

Technical Specification 3G TS 25.301, "Radio Interface Protocol", version 3.4.0, Publication of the 3rd Generation Partnership Project, Mar. 2000.
Technical Specification 3G TS 25.321, "MAC Protocol Specification", version 3.3.0, Publication of the 3rd Generation Partnership Project, Mar. 2000.
Technical Specification 3G TS 25.331, "RRC Protocol Specification", version 3.2.0, Publication of the 3rd Generation Partnership Project, Mar. 2000.
Technical Specification 3G TS 25.401, "UTRAN Overall Description", version 3.1.0, Publication of the 3rd Generation Partnership Project, Jan. 2000.
Technical Specification 3G TR 25.832, "Manifestations of Handover and SRNS Relocation", version 3.0.0, Publication of the 3rd Generation Partnership Project, Oct. 1999.

*Primary Examiner*—Temica M. Beamer
(74) *Attorney, Agent, or Firm*—DLA Piper Rudnick Gray Cary US LLP

(57) ABSTRACT

The infrastructure has a core network, radio network controllers linked to the core network and base stations provided with radio interfaces and each linked to one of the controllers. Ciphered information is transmitted over a first communication path in circuit mode between the core network and the terminal, passing through a first master controller, then over a second communication path in circuit mode between the core network and the terminal, passing through a second master controller. The second path is established in a transfer procedure comprising the transmission of adjustment data from the first to the second master controller and the suppression of the first path. These data are representative of a current value of a sequence number used to encipher the information and incremented at regular intervals, and of an offset between this sequence number and a time reference available to the second controller.

31 Claims, 6 Drawing Sheets

METHOD OF CONTROLLING A CHANNEL BETWEEN A RADIO TERMINAL AND A CELLULAR RADIOCOMMUNICATION INFRASTRUCTURE, AND ACCESS NETWORK IMPLEMENTING SUCH A METHOD

BACKGROUND OF THE INVENTION

The present invention relates to the field of radiocommunications, and in particular to the ciphering techniques used in cellular networks.

The invention finds application in particular in third-generation cellular networks of the UMTS type ("Universal Mobile Telecommunication System") using code division multiple access (CDMA) techniques.

The invention is described hereinbelow in its application to a UMTS network, of which FIG. 1 shows the architecture.

The switches of the mobile service 10, belonging to a core network (CN), are linked on the one hand to one or more fixed networks 11 and on the other hand, by means of a so-called Iu interface, to control equipment 12 or RNCs ("Radio Network Controllers"). Each RNC 12 is linked to one or more base stations 13 by means of a so-called Iub interface. The base stations 13, distributed over the territory covered by the network, are capable of communicating by radio with the mobile terminals 14, 14a, 14b called UE ("User Equipment"). The base stations can be grouped together to form nodes called "node B". Certain RNCs 12 may furthermore communicate with one another by means of a so-called Iur interface. The RNCs and the base stations form an access network called UTRAN ("UMTS Terrestrial Radio Access Network").

The UTRAN comprises elements of layers 1 and 2 of the OSI model with a view to providing the links required on the radio interface (called Uu), and a stage 15A for controlling the radio resources (RRC, "Radio Resource Control") belonging to layer 3, as described in the technical specification 3G TS 25.301, "Radio Interface Protocol", version 3.4.0, published in March 2000 by the 3GPP (3$^{rd}$ Generation Partnership Project). Seen from the higher layers, the UTRAN acts simply as a relay between the UE and the CN.

FIG. 2 shows the RRC stages 15A, 15B and the stages of the lower layers which belong to the UTRAN and to UE. On each side, layer 2 is subdivided into a radio link control (RLC) stage 16A, 16B and a medium access control (MAC) stage 17A, 17B. Layer 1 comprises a coding and multiplexing stage 18A, 18B. A radio stage 19A, 19B caters for the transmission of the radio signals from trains of symbols provided by the stage 18A, 18B, and the reception of the signals in the other direction.

There are various ways of adapting the architecture of protocols according to FIG. 2 to the hardware architecture of the UTRAN according to FIG. 1, and in general various organizations can be adopted depending on the types of channels (see section 11.2 of the technical specification 3G TS 25.401, "UTRAN Overall Description", version 3.1.0, published in January 2000 by the 3GPP). The RRC, RLC and MAC stages are located in the RNC 12. Layer 1 is located for example in node B. A part of this layer may however be located in the RNC 12.

When several RNCs are involved in a communication with UE, there is generally a so-called serving RNC called SRNC where the modules pertaining to layer 2 (RLC and MAC) are located, and at least one drift RNC called DRNC to which is linked a base station with which the UE is in a radio link. Appropriate protocols cater for the exchanges between these RNCs over the Iur interface, for example ATM ("Asynchronous Transfer Mode") and AAL2 ("ATM Adaptation Layer No. 2"). These same protocols can also be employed over the Iub interface for the exchanges between a node B and its RNC.

Layers 1 and 2 are each controlled by the RRC sublayer, whose characteristics are described in the technical specification 3G TS 25.331, "RRC Protocol Specification", version 3.1.0, published in October 1999 by the 3GPP. The RRC stage 15A, 15B supervises the radio interface. Moreover, it processes streams to be transmitted to the remote station according to a "control plan", as opposed to the "user plan" which corresponds to the processing of the user data arising from layer 3.

The RLC sublayer is described in the technical specification 3G TS 25.322, "RLC Protocol Specification", version 3.2.0, published in March 2000 by the 3GPP. In the transmit direction, the RLC stage 16A, 16B receives, according to the respective logical channels, data streams consisting of service data units (RLC-SDU) arising from layer 3. An RLC module of the stage 16A, 16B is associated with each logical channel so as in particular to perform a segmentation of the RLC-SDU units of the stream into protocol data units (RLC-PDU) addressed to the MAC sublayer and comprising an optional RLC header. In the receive direction, an RLC module conversely performs a reassembling of the RLC-SDU units of the logical channel from the data units received from the MAC sublayer.

The RLC stage 16A, 16B can have several modes of operation as a function in particular of the type of logical channel. Subsequently in the present description, consideration will be given to the transparent mode of the RLC sublayer, which is suitable for a logical channel relating to a communication in circuit mode. In this transparent mode, the RLC module performs the segmentation and reassembling operations when they are necessary, and it does not introduce any header into the RLC-PDU units.

The MAC sublayer is described in the technical specification 3G TS 25.321, "MAC Protocol Specification", version 3.3.0, published in March 2000 by the 3GPP. It transposes one or more logical channels onto one or more transport channels TrCH. In the transmit direction, the MAC stage 17A, 17B can multiplex one or more logical channels in one and the same transport channel. On such a transport channel, the MAC stage 17A, 17B delivers successive transport blocks TrBk each consisting of an optional MAC header and an RLC-PDU unit arising from an associated logical channel.

For each TrCH, the RRC sublayer provides the MAC sublayer with a set of transport formats (TFS, "Transport Format Set"). A transport format comprises a transmission time interval (TTI) equal to 10, 20, 40 or 80 ms, a transport block size, a transport block set size and parameters defining the protection scheme to be applied in the TrCH by layer 1 for detecting and correcting transmission errors. Depending on the current bit rate on the logical channel or channels associated with the TrCH, the MAC stage 17A, 17B selects a transport format from the TFS assigned by the RRC sublayer, and it delivers in each TTI a set of transport blocks complying with the selected format, whilst indicating this format to layer 1.

Layer 1 can multiplex several TrCHs on a given physical channel. In this case, the RRC sublayer assigns a set of combinations of transport formats (TFCS, "Transport Format Combination Set") to the physical channel, and the MAC sublayer dynamically selects a combination of transport formats from this TFCS set, thereby defining the transport formats to be used in the various multiplexed TrCHs.

UMTS uses the spread spectrum CDMA technique, that is to say the symbols transmitted are multiplied by spreading codes consisting of samples called "chips" whose rate (3.84 Mchip/s in the case of UMTS) is greater than that of the symbols transmitted. The spreading codes distinguish various physical channels (PhCH) which are superimposed on the same transmission resource consisting of a carrier frequency. The auto- and cross-correlation properties of the spreading codes enable the receiver to separate the PhCHs and to extract the symbols intended therefor. For UMTS in FDD mode ("Frequency Division Duplex") on the downlink, a scrambling code is allocated to each base station, and various physical channels used by this base station are distinguished by mutually orthogonal channel codes (channelization codes). The base station can also use several mutually orthogonal scrambling codes. On the uplink, the base station uses the scrambling code to separate the transmitting UEs, and possibly the channel code to separate the physical channels arising from one and the same UE. For each PhCH, the overall spreading code is the product of the channel code and the scrambling code. The spreading factor (equal to the ratio of the chip rate to the symbol rate) is a power of 2 lying between 4 and 512. This factor is chosen as a function of the bit rate of symbols to be transmitted on the PhCH.

The various physical channels are organized in 10 ms frames which follow one another on the carrier frequency used by the base station. Each frame is subdivided into 15 time slots of 666 µs. Each slot can carry the superimposed contributions of one or more physical channels, comprising common channels and DPCH ("Dedicated Physical CHannel") dedicated channels. Each DPCH conveys with the data a transport format combination indicator TFCI arising from the MAC sublayer, enabling the destination MAC module to retrieve the structure of the TrBks.

For one and the same communication, it is possible to establish several DPCHs corresponding to different channel codes, whose spreading factors may be equal or different. This situation is encountered in particular when a DPCH is not sufficient to provide the transmission bit rate required by the application. Furthermore, this same communication can use one or more transport channels. The coding and the multiplexing of the information symbol streams arising from the TrCHs on the PhCHs are described in detail in the technical specification 3G TS 25.212, "Multiplexing and channel coding (FDD)", version 3.0.0, published in October 1999 by the 3GPP.

As regards each logical channel for which the processing module of the RLC sublayer operates in transparent mode, the MAC stage 17A, 17B caters moreover for ciphering of the information transmitted and deciphering of the information received. On the corresponding transport channel, the TrBks relating to this logical channel each consist of an RLC-PDU unit ciphered according to a mechanism described in chapter 8 of the aforesaid 3G TS 25.301 specification.

FIG. 3 illustrates the ciphering module 20 of the MAC stage 17A, 17B of the RNC or of the UE, used for a logical channel. An ciphering algorithm 21 is executed so as to generate a binary mask which is combined with the information bits of the RLC-PDU unit received in transparent mode from the RLC, by an exclusive OU operation (gate 22). An identical module is useable for deciphering. The algorithm 21 calculates the mask on the basis of the following parameters:

CK: secret ciphering key of M=32 bits, defined in a prior phase of authentication between the core network and the UE;

CSN: ciphering sequence number composed of M=32 bits;

BEARER: logical channel identifier, serving to generate different masks for the various logical channels;

DIRECTION: bit indicating the direction of transmission (uplink or downlink), serving to generate different masks in both directions;

LENGTH: length of the mask in number of bits, given by the RRC stage as a function of the transport format.

The algorithm 21 combines the M-bit number CSN with the key CK with the aim of precluding the same mask from being used to encipher different blocks. This number CSN is incremented at the rate of the 10 ms radio frames. FIG. 3 thus shows the 32-bit counter 23 which delivers the parameter CSN. This counter increments the number CSN by a quantity N with each new block of the logical channel, N being the number of frames per TTI on the transport channel bearing this logical channel (N=1, 2, 4 or 8). The counter is therefore incremented by 1 every 10 ms, by 2 every 20 ms, by 4 every 40 ms or by 8 every 80 ms. On initializing the ciphered communication, the RRC stage provides an initial value $CSN_0$ of the number CSN and a start command for the counter 23 (START). These operations are performed both in the RNC where the MAC task is executed and in the UE.

A problem considered in the present invention is that of the transferring of the CSN counters upon a shift of the MAC module catering for the ciphering function in the network infrastructure. Such a movement takes place in the context of a transfer procedure involving a change of radio access resource (handover). The transfer procedure can thus give rise to a change of SRNC, thereby requiring the CSN counter of the new SRNC to be synchronized with that of the previous SRNC (and of the UE), whereas the Iu and/or Iur interfaces available to the RNCs for communicating with one another are asynchronous. It is also possible to envisage cases where the movement of the MAC module would take place inside one and the same RNC, if the latter uses different circuits to manage the access resources employed before and after the transfer.

Various possible scenarios for the transfer procedure are described in the technical specification 3G TR 25.832, "Manifestations of Handover and SRNS Relocation", version 3.0.0, published in October 1999 by the 3GPP. One distinguishes between on the one hand soft handover (SHO) which uses a macrodiversity mode and which may possibly be followed by a change of SRNC called "relocation" and on the other hand hard handover (HHO) which corresponds for example to a change of carrier frequency (with or without change of RNC) and/or to a handoff between two RNCs (of one and the same access network or of different access networks) which cannot communicate with one another via an Iur interface. An HHO can take place inside a UTRAN if several carrier frequencies are allotted to its operator or if Iur interfaces are not provided between all the RNCs of this UTRAN. An HHO can also take place between two separate access networks, for example between two UTRANs or between a UTRAN and a system of a different kind based on a similar functional architecture making it possible in particular to use the same ciphering procedures, such as a system of the GERAN type ("GSM/EDGE Radio Access Network").

In FDD mode, the UMTS supports a macrodiversity technique, which consists in making provision for UE to be able to communicate simultaneously with separate base stations in such a way that, in the downlink, the UE receives the same information several times and, in the uplink, the radio signal transmitted by the UE is picked up by the base stations so as to form different estimates which are subsequently combined in the UTRAN.

The macrodiversity affords a gain in reception which improves the performance of the system by virtue of the combining of different observations of one and the same item of information. It also makes it possible to carry out soft intercell transfers (SHO), when the UE moves.

In macrodiversity mode, the routing of the transport channels for multiple transmission from the UTRAN or UE and the combining of these transport channels in reception are operations which are incumbent on a selection and combining module belonging to layer 1. This module is at the interface with the MAC sublayer, and it is located in the RNC serving the UE. If the base stations involved depend on different RNCs communicating through the Iur interface, one of these RNCs plays the role of SRNC and the other that of DRNC.

When an SHO is completed, the radio link between the UE and the original base station is broken. It may then happen that no base station within whose range the UE is located is within the dependency of the SRNC.

The UTRAN may very well continue to support the communication in this way. However, this is not optimal since it is possible to dispense with the exchanges occurring on the Iur interface and to free the previous SRNC, by contriving matters so that the DRNC becomes the new SRNC for the communication in progress. This is the subject of the relocation procedure ("SRNS Relocation", see section 7.2.3.2 of the aforesaid 3G TS 25.401 specification), triggered on the initiative of the previous SRNC.

This relocation procedure comprises the transferring of the RLC and MAC instances (as well as of the selection and recombination module of layer 1 if the macrodiversity is maintained) from the previous SRNC to the previous DRNC.

A problem posed by this is the transferring of the CSN counter employed by the ciphering algorithm in the transparent RLC mode. Specifically, this counter must remain synchronous with that situated in the MAC layer on the UE side, whereas the links between the RNCs (through the Iu interface and the core network or through the Iur interface) are in principle asynchronous.

The 32-bit number CSN can be broken down into a connection frame number CFN corresponding to the P least significant bits (LSB) of CSN and into a HyperFrame Number HFN corresponding to the 32-P most significant bits (MSB) (P=8 according to chapter 8 of the aforesaid 3G TS 25.301 specification).

The RNC supervising each cell served by a base station 13 updates for this cell a system frame number SFN, coded on Q=12 bits, which is incremented with each new 10 ms radio frame. This number SFN is broadcast by the base station over its common control channels.

An UE measures the time offset between the signals which it picks up from the cells neighboring its current cell and its own clock. Before the triggering of an SHO to a target cell, the UE provides its SRNC with the offset which it has measured in respect of this target cell, which corresponds to the offset, within a span of $2^P \times 10$ ms (i.e. 2.56 s), between the SFN counter of the target cell, obtained on the common channel, and its own CFN counter. This offset is determined, on the basis of detecting synchronization patterns, with a temporal precision substantially finer than 10 ms, for example of the order of the symbol time. It serves to temporally clamp the transmission of the new base station, to which it is addressed through the Iur interface, so that in macrodiversity mode, the information items received by the UE from the various stations are not too offset with respect to one another, which would require an excessive amount of memory to be able to combine the observations.

Owing to the provision of this offset, the DRNC knows a priori the P least significant bits of the CSN counter to be employed for ciphering and deciphering. However, this does not provide the most significant bits (HFN). The current 3GPP specifications provide for the relocation procedure to comprise the sending by the SRNC of a message "Relocation_Required" over the Iu interface, in which the HFN number is inserted so that the DRNC can synchronize its ciphering sequence counter. On receipt of this message, the core network instigates the task which will lead to the routing of the communication to the DRNC, and retransmits the HFN to the latter transparently.

These arrangements do not solve the aforesaid problem since between the moment at which the SRNC transmits the value of HFN and that at which the DRNC receives it, the HFN in force on the UE side has been able to be incremented. This occurs each time the HFN takes more than 2.56 s to be received by the DRNC, this being difficult to avoid with certainty given the queues which may be encountered by the messages in the asynchronous core network and the times for processing the "Relocation_Required" message by the switches 10. Errors may also arise if the HFN takes less time to arrive at the DRNC: if it is transmitted at a moment where CFN is equal to 255 for example, it is very likely to be received by the DRNC after incrementation of the HFN value at the UE.

The above problem is encountered, with even greater acuteness, in the HHOs which are executed without using the macrodiversity mode.

In an HHO, there is generally a double broadcasting phase during which the same item of downlink information is transmitted simultaneously on both access resources. This enables the UE to receive the information intended for it without interruption as soon as it switches to the second access resource. Hence, the RNC in charge of the target cell must rapidly become aware of the ciphering sequence counter CSN relating to the UE when an HHO is to be executed. Moreover, the RNC of the target cell, if it is different from the previous SRNC, generally has no prior awareness of the CFN counter since there is no macrodiversity. The value sent by the previous SRNC must therefore cover as far as the least significant bits of CSN so that it will very likely be obsolete when it is received by the RNC of the target cell, given the routing times through the asynchronous network. This drawback is difficult to eliminate in the absence of synchronization of the base stations, which synchronization is not necessary for the operation of a UMTS network and is not utilized by the standard.

It should be noted that in the non-transparent modes of the RLC sublayer, the problem considered above does not arise. These non-transparent modes are intended for packet transmissions, for which there is generally no harm in momentarily interrupting the transmission during a handover or during a relocation procedure so as to ensure, for example by an acknowledgement mechanism, that the correct counter value has been received. Moreover, it is the RLC sublayer which caters for the ciphering/deciphering function in the non-transparent mode, by using a sequence number of the header of each RLC-PDU unit to encipher the data contained in this RLC-PDU unit. This sequence number is transmitted unencrypted, so that the ciphering counters need not be synchronized at the two ends.

In the second-generation GSM systems ("Global System for Mobile communication") using Time Division Multiple Access (TDMA) techniques, the ciphering is effective only over the air interface. The incrementation of the ciphering key is based on the synchronization with respect to the TDMA hyperframes, which is achieved in an unambiguous manner on either side of the radio link in the framework of the time multiplexing scheme. Therefore, the above problem does not arise either.

WO98/09458 discloses a radio access system derived from GSM, in which the ciphering of the communications is carried out only over the air interface. A constraint of this system is that it requires synchronization of the base stations on the scale of the TDMA multiframes. Moreover, the synchronization of the ciphering counters is lost when the exchanges between the base stations take a time greater than the relatively short duration of a multiframe (120 ms).

An object of the present invention is to afford a solution to the abovementioned problem of synchronizing ciphering counters.

SUMMARY OF THE INVENTION

The invention thus proposes a method of controlling a circuit mode communication logical channel between a radio terminal and a cellular radiocommunication infrastructure. The infrastructure comprises at least one core network, radio network controllers linked to the core network and comprising first and second controllers, and base stations provided with radio interfaces and each linked to one of the radio network controllers. The method comprises the steps of:

establishing at least one first communication path between the core network and the terminal, passing through one of the base stations and through the first controller constituting a master controller for said first path;

transmitting information pertaining to the logical channel along the first communication path;

establishing at least one second communication path between the core network and the terminal, passing through one of the base stations and through the second controller constituting a master controller for said second path; and transmitting information pertaining to the logical channel along the second communication path.

The information transmitted along each communication path is ciphered in a portion of said path going from the master controller to the radio terminal. The ciphering is performed as a function of parameters comprising a secret key and a ciphering sequence number combined with said key. The master controller and the terminal jointly increment the ciphering sequence number at the rate of frames of determined duration, so as to have the same ciphering parameters to allow deciphering of the information. The second path is established in a transfer procedure which comprises transmitting adjustment data from the first controller to the second controller and suppressing each first path. Said adjustment data are representative of a current value of the ciphering sequence number and of an offset between the ciphering sequence number and a time reference available to the second controller.

This makes it possible to preserve the continuity of incrementation of the ciphering sequence number in the radio terminal. The second controller processes the adjustment data received from the first controller to align the ciphering sequence number which it increments with that incremented autonomously by the radio terminal. The execution of the transfer procedure can therefore be transparent to the MAC layer of the terminal.

The offset between the ciphering sequence number and the time reference available to the second controller is preferably measured by the terminal on the basis of radio signals received from a base station linked to the second controller and carrying information relating to said time reference. This time reference advantageously corresponds to a frame counter maintained for a base station linked to the second controller.

In the case of a relocation procedure following an SHO, this offset may have been at least in part provided to the second controller in the course of the establishing of a new communication path passing through a base station linked to this second controller. Thus, in one embodiment of the method, the transfer procedure comprises:

a phase of establishing at least one first additional path between the core network and the radio terminal, passing through a base station linked to the second controller and through the second controller in addition to the first controller constituting the master controller, during which some at least of the adjustment data representative of said offset are transmitted from the first controller to the second controller;

a macrodiversity phase during which information pertaining to the logical channel is transmitted simultaneously along at least two first communication paths including said first additional path; and a relocation phase during which the adjustment data representative of the current value of the ciphering sequence number are transmitted from the first controller to the second controller, after which each first path is replaced by a second path not passing through the first controller.

To simplify the procedure, the relocation phase will generally be performed after a phase of suppressing each first path not passing through the second controller.

When there is a macrodiversity phase, the adjustment data are advantageously transmitted from the first controller to the second controller through an interface provided between the radio network controllers, without passing through the core network. This avoids the need for the messages transporting the offset data to have to be processed by the switches of the core network, thereby minimizing the duration of transmission of the adjustment data and hence the risk of them arriving late at the second controller.

Alternatively, the adjustment data transmitted during the phase of establishing the first additional path may be transmitted through the interface provided between the radio network controllers, without passing through the core network, whilst the remainder of the adjustment data is transmitted during the relocation phase through the core network. This is advisable in particular when the offset is represented on a number of bits greater than that required for the execution of the SHO. The risk of obsolescence of the adjustment data transmitted through the core network is then reduced since these data may be validated insofar as they do not reach the second controller with a delay greater than one cycle of the offset values.

In another embodiment of the method, the first and second paths have radio links respectively supported by different access resources, for example different carrier frequencies (HHO case). The transfer procedure may then comprise:

sending the adjustment data from the first controller to the second controller once the terminal is within radio range of a base station of the second path, linked to the second controller;

a phase of simultaneous transmission of radio signals transporting the same information ciphered by the respective base stations of the first and second paths;

switching over the terminal from the radio link of the first path to the radio link of the second path; and suppressing the first path, the terminal transmitting and receiving the ciphered information along the second path.

In this case, the adjustment data are generally transmitted from the first controller to the second controller through the core network.

Another aspect of the present invention relates to an access network of a cellular radio-communication system comprising at least one radio network controller arranged to implement a method as defined hereinabove.

DESCRIPTION OF PREFERRED EMBODIMENTS

Figures 4, 11:
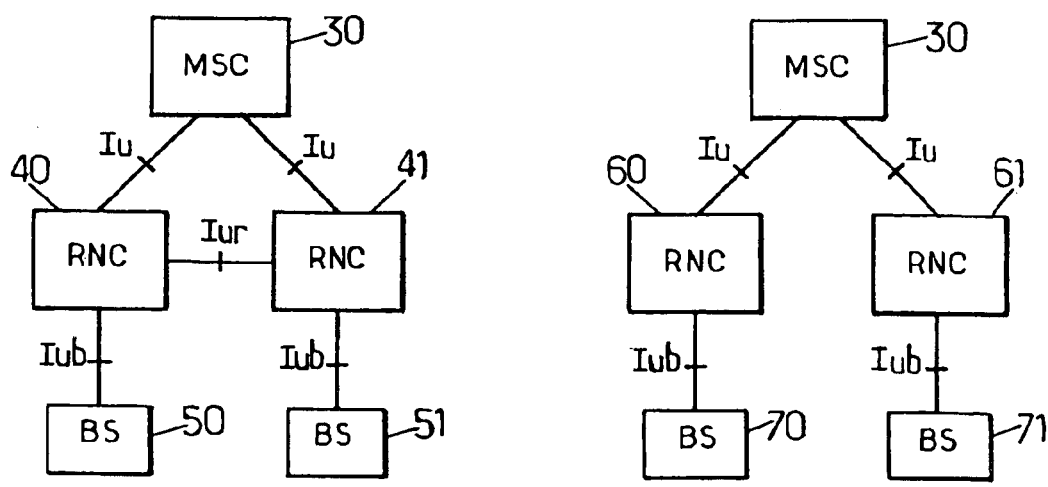
FIG. 4 is a simplified diagram of a UMTS network to which the invention may be applied.
FIG. 11 is a simplified diagram of another UMTS network to which the invention may be applied.

FIG. 4 shows a UMTS network infrastructure for supporting the mode of macrodiversity between several SRNSs. The infrastructure sketched has a deliberately simplified configuration to clarify the explanation of the invention. The core network comprises a mobile service switch (MSC, "Mobile service Switching Centre") 30 for the circuit mode, linked by Iu interfaces to two radio network subsystems (SRNS) each having an RNC 40, 41. The two RNCs 40, 41 communicate with one another via an Iur interface and respectively monitor base stations 50, 51 (node B) through Iub interfaces.

Figure 1:
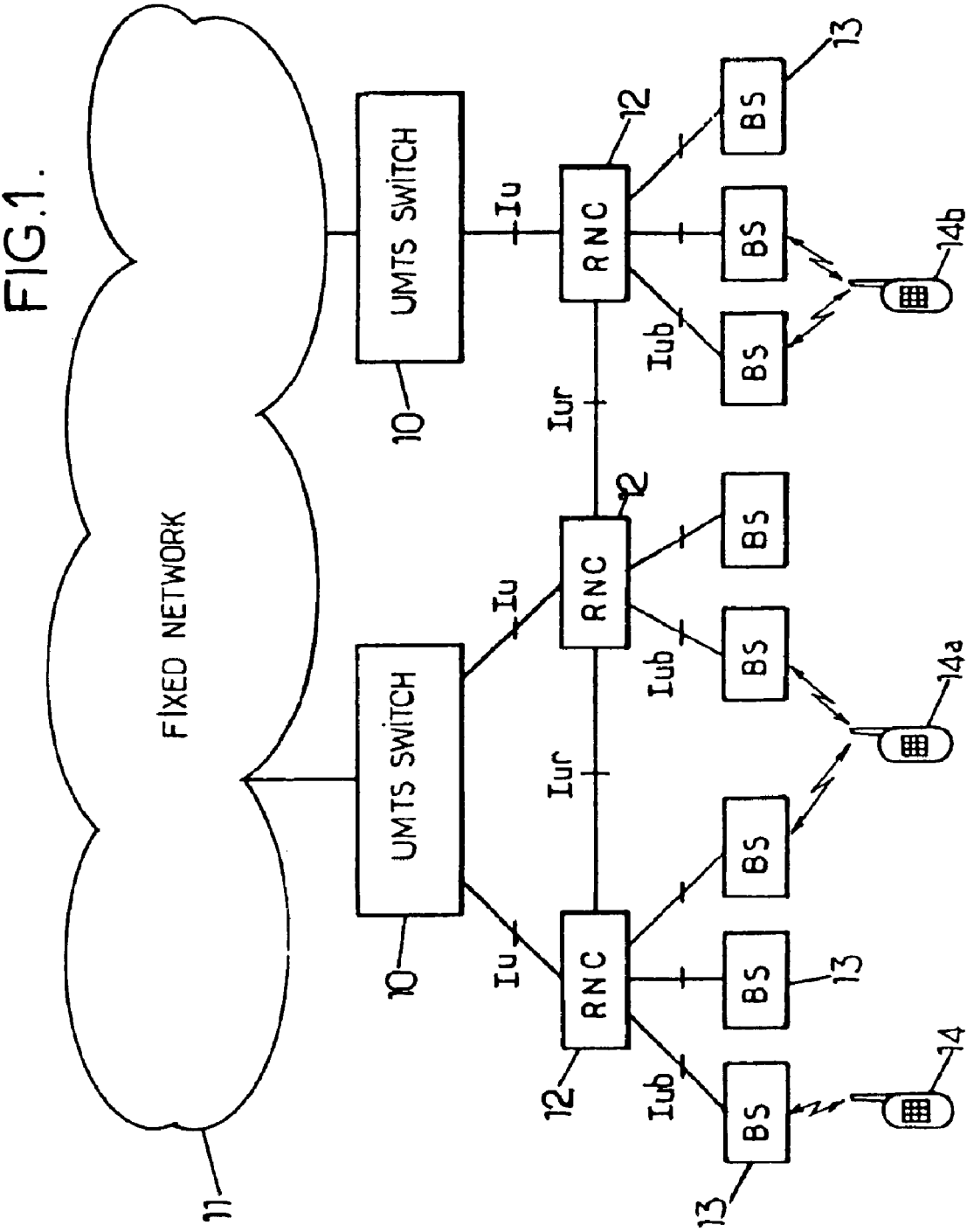
FIG. 1, previously commented on, is a diagram of a UMTS network.
Figure 2:
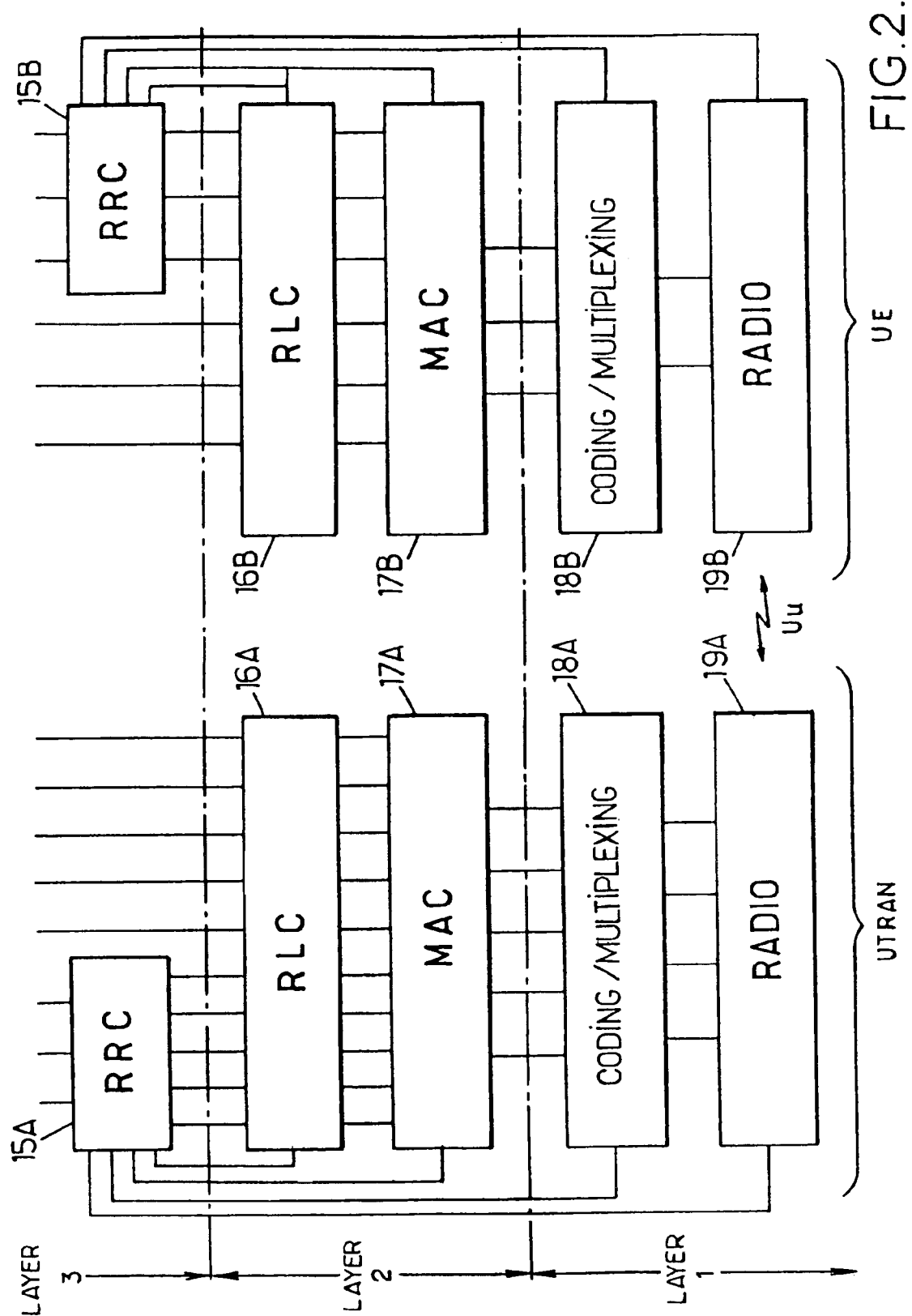
FIG. 2, previously commented on, is a chart showing the organization in layers of communication protocols employed over the radio interface of the UMTS network.
Figure 3:
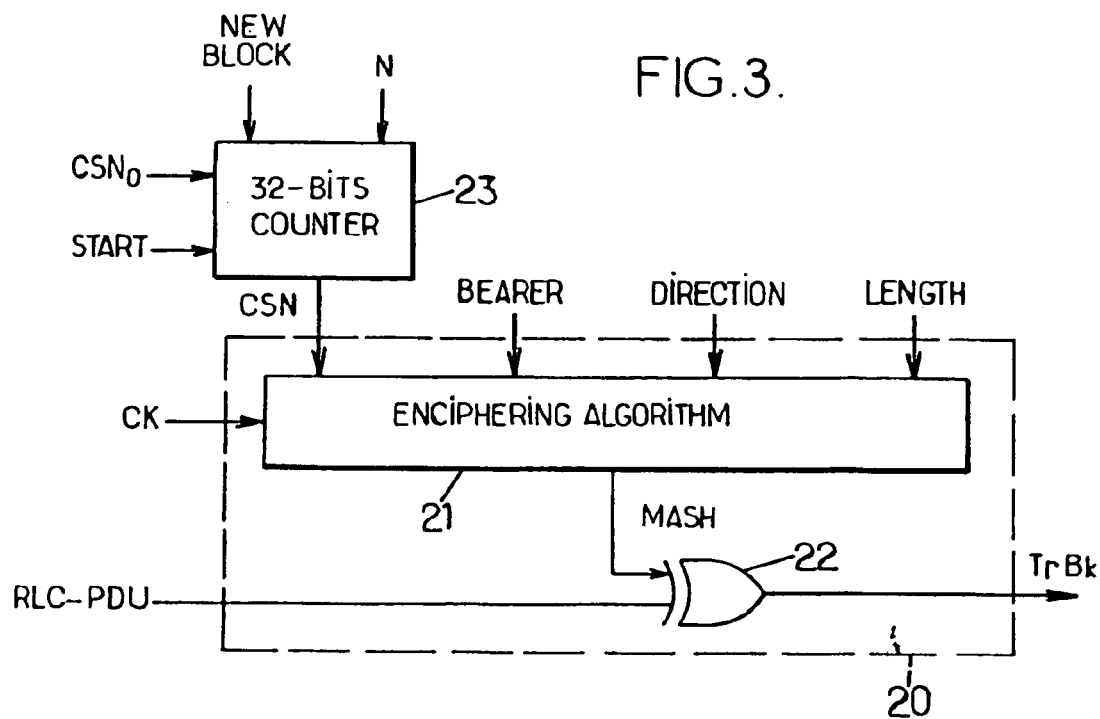
FIG. 3, previously commented on, is a schematic diagram of a ciphering module used in the MAC layer of a UMTS network.
Figure 5:
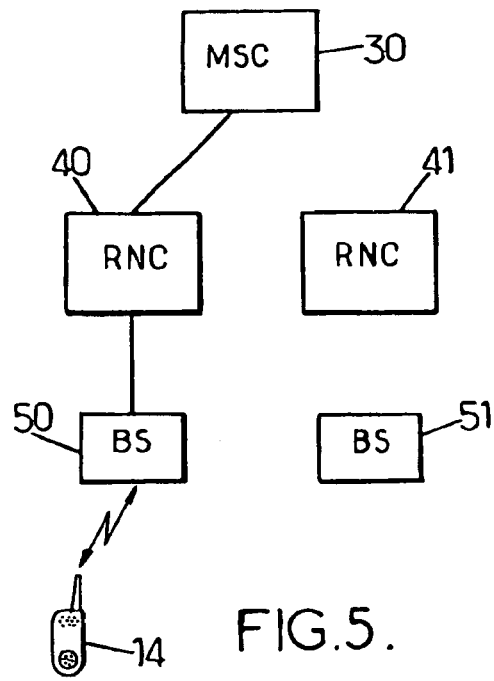
FIGS. 5 to 8 are diagrams of the network of FIG. 4 showing the links which are active at various instants of a communication.

FIGS. 5 to 8 show active communication paths between the core network and UE 14 when the latter is moving. In the situation of FIG. 5, a first path has been established in a conventional manner between the MSC 30 and the UE 14 through the RNC 40 playing the role of SRNC and the base station 50. The SRNC 40 and the UE each have an MAC instance which, for each dedicated logical channel in circuit mode and each direction of communication, caters for the ciphering and deciphering functions in respect of the information transmitted over this first path, in the manner indicated with reference to FIG. 3. The static parameters (CK, BEARER, DIRECTION, LENGTH) of the module 20 and the initialization parameters for the counter 23 have been provided by the RRC stage.

Figure 6:
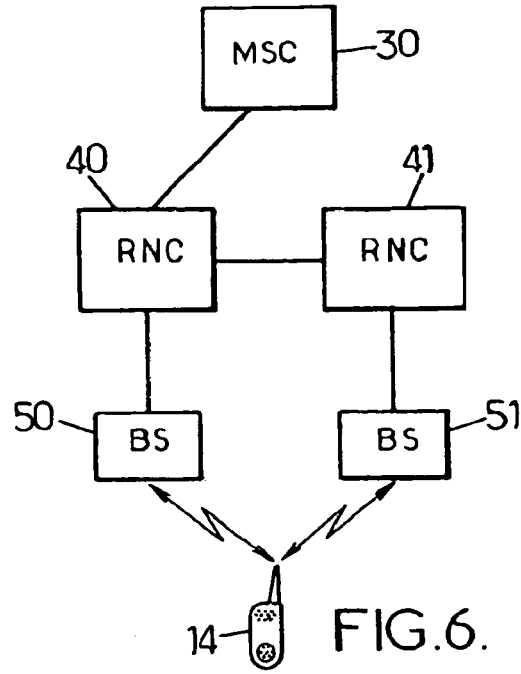

In the situation of FIG. 6, another path has been established in macrodiversity mode between the MSC 30 and the UE 14 through the RNC 40, the RNC 41 playing the role of DRNC and the base station 51. Before the establishing of this other path, the UE 14 has measured the time offset $\Delta$ between its own ciphering sequence number CSN and the frame number SFN broadcast by the base station 51 over its downlink common channels. This offset $\Delta$ is measured with a finer resolution than that of the 10 ms frames. Its value is forwarded by the UE to the SRNC 40 (RRC layer) and the SRNC 40 transmits it to the DRNC 41 over the Iur interface in the macrodiversity establishment procedure, so that the base station 51 has, as regards the UE 14, a transmission aligned with that of the base station 50 on a scale of the order of the symbol time.

In the current state of the specifications, the RRC layer of the UE communicates to that of its SRNC the value of $\Delta$ modulo $2^P \times 10$ ms=2.56 s. We denote by $\Delta_k$=(CSN−SFN) mod $2^k$ the number represented by the k least significant bits of the integer part of the offset $\Delta$ expressed in units of 10 ms ($1 \leq k \leq Q$). The CSN being on M=32 bits and the SFN on Q=12 bits, the UE measures $\Delta_Q = \Delta_{12}$. However, it only advises the UTRAN of $\Delta_P = \Delta_8$.

In the situation of FIG. 6, the logical channel is ciphered on each of the two paths by the same ciphering/deciphering modules situated in the MAC sublayers of the SRNC 40 and of the UE 14. A selection and combination module has been created in layer 1, on the one hand in the SRNC 40 and on the other hand in the UE 14.

Figure 7:
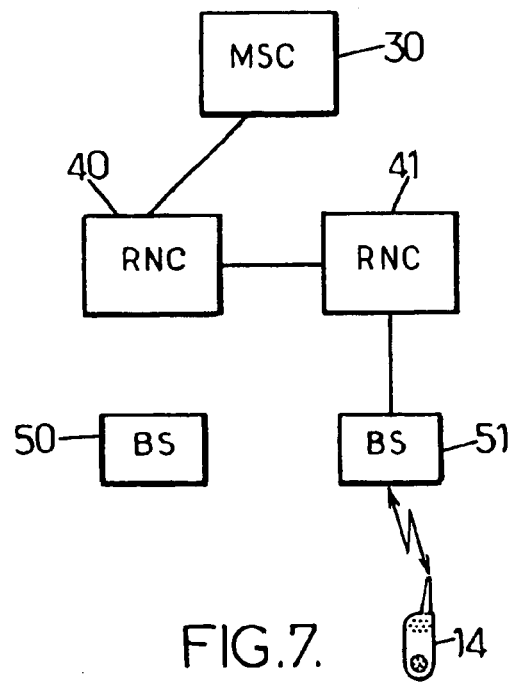

In the situation of FIG. 7, the path passing through the base station 50 has been suppressed, the radio link no longer being of fairly good quality. The RNC 40 still plays the role of SRNC although it no longer has any base station in radio link with the UE. Conversely, the other path is preserved (there could of course be still other paths passing through the DRNC 41 in macrodiversity mode; furthermore, the path which has been established first by way of the DRNC 41 could have been suppressed).

Figure 8:
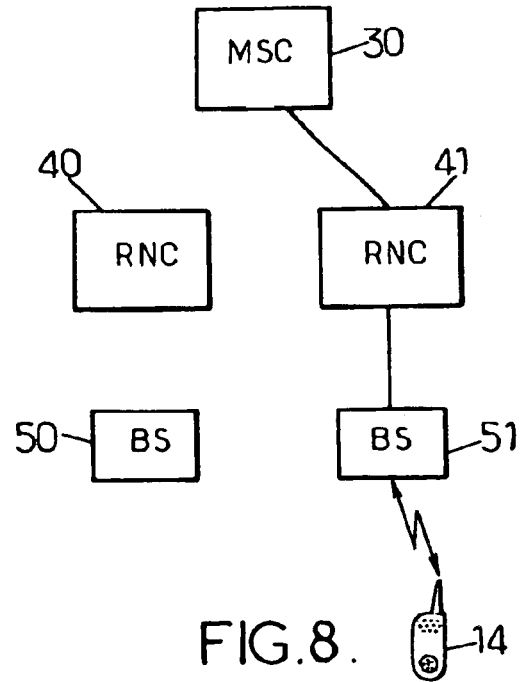

The specifications provide that in such a situation, the SRNC 40 can request a relocation leading to the situation illustrated by FIG. 8: the previous DRNC 41 becomes the new SRNC to which the MSC 30 switches the communication. The request is made in a "Relocation_Required" message transmitted to the MSC over the Iu interface and containing a field intended to be transmitted transparently from the RRC layer of the source RNC 40 to that of the target RNC 41. According to the current specifications, this field contains the current HFN, that is to say the M−P=24 most significant bits of the ciphering sequence number CSN used by the RNC 40 and the UE 14. The core network processes the "Relocation_Required" message and transmits the value of HFN in a transparent manner to the RNC 41, the latter being able to supplement it with the current value of the CFN deduced from the SFN counter of the target cell and from the offset $\Delta_8$ previously received: CFN=(SFN+ $\Delta_8$) mod $2^8$. The number CSN thus supplemented can be used by the new MAC instance created in the RNC 41 for the logical channel. However, this CSN is erroneous if the HFN has been modified at the level of the UE during the time of transit of the HFN between the RNCs 40 and 41.

Figure 9:
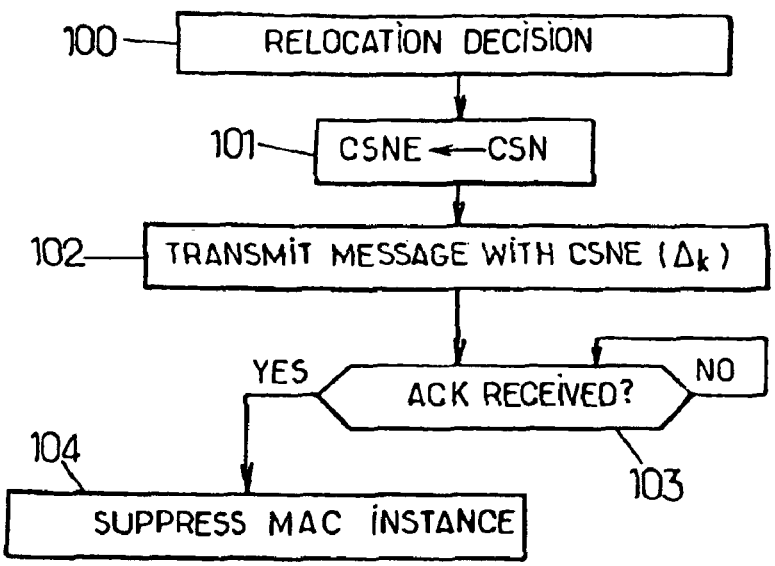
FIGS. 9 and 10 are flow charts of steps of a relocation procedure which are executed respectively by a source RNC and by a target RNC.
Figure 10:
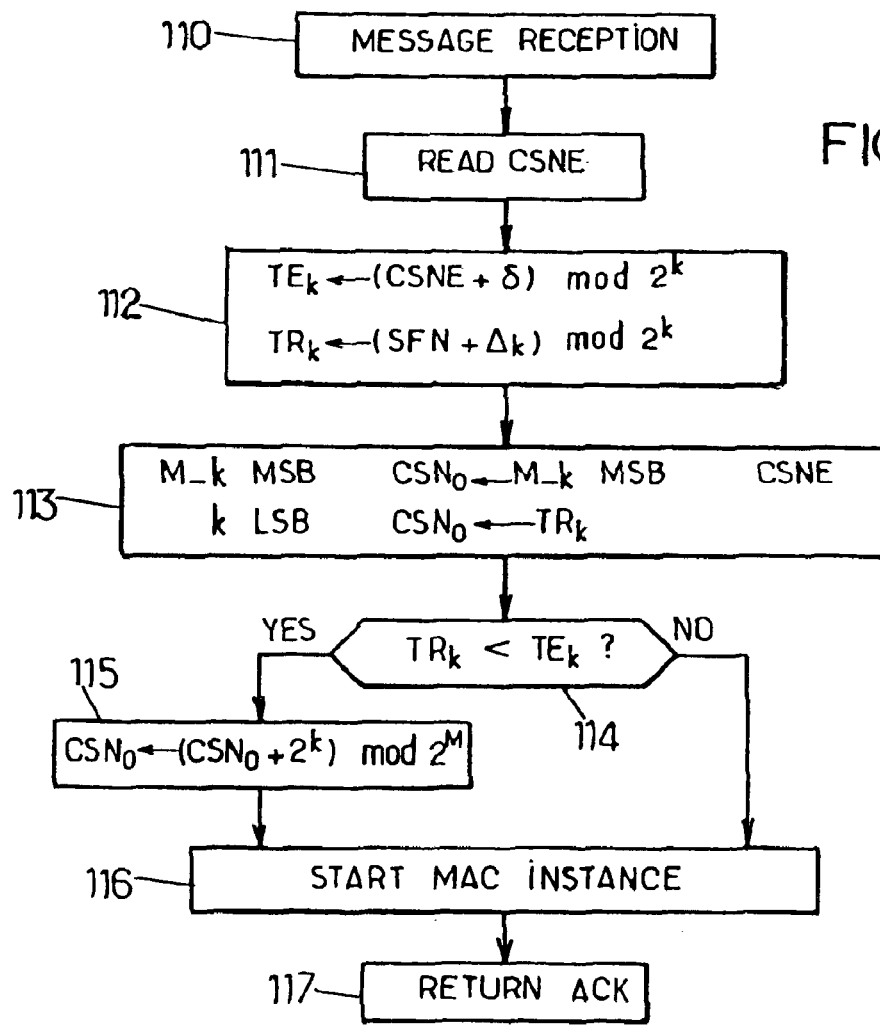

To avoid these errors, the RNCs 40, 41 can apply the relocation procedure of FIGS. 9 and 10 which can be executed in the RRC layer.

Once relocation has been decided on (step 100 of FIG. 9), the source RNC 40 notes the current value CSNE of the ciphering sequence number CSN (step 101) and sends it to the target RNC 41 in a message which can moreover contain all or some of the bits of a quantity $\Delta_k$ with $k \leq Q$ (step 102), after which it waits for an acknowledgement of this message (step 103).

If $k \leq P$, it is not necessary to include $\Delta_k$ in the message since $\Delta_P$, is already known to the RNC 41.

If $P<k \leq Q$, we can include $\Delta_k$ therein or only its k-P most significant bits. This can be achieved by adapting the report of measurements which is sent to the SRNC by the UE on the RRC connection so that this report includes $\Delta_k$ (which is measured) and not only $\Delta_P$.

When it receives this message (step 110 of FIG. 10), the target RNC 41 reads in step 111 the value CSNE which it contains and as appropriate the information regarding the offset $\Delta_k$, then in step 112 it calculates two frame indices $TE_k$ and $TR_k$ according to:

$$TE_k = (CSNE + \delta) \bmod 2^k$$

$$TR_k = (SFN + \Delta_k) \bmod 2^k$$

where SFN is the current value of the frame counter of the target cell, corresponding to the frame for which the counter 23 of the RNC 41 will be initialized at a value $CSN_0$. The index $TE_k$ represents, in a cycle of $2^k$ frames which is positioned with respect to the counting down of CSN by the UE, the instant starting from which the message is expected at the target RNC. The positive or 0 integer $\delta$ designates a minimum duration of routing of the message in units of 10 ms. If there is no a priori information regarding this minimum duration, we take $\delta=0$. The index $TR_k$ represents, in the same cycle, the current value of the k least significant bits of the number CSN at the level of the UE. The assigning of $TR_k$ to the k least significant bits of $CSN_0$ is performed in step 113, where the M-k most significant bits of CSNE are further assigned to those of $CSN_0$.

If the index $TR_k$ is smaller than the index $TE_k$ (step 114), there has been an overflow in the k least significant bits of the CSN counter maintained by the UE during the routing of the message, so that the most significant bits must be updated. To do this, the initialization value $CSN_0$ is increased by $2^k$, modulo $2^M$, in step 115. If $TR_k \geq TE_k$ in step 114, the initialization value $CSN_0$ obtained in step 113 is correct.

The target RNC 41 can then start the MAC instance for the communication in progress, and in particular the ciphering module 20 and its associated counter 23 (step 116). It also creates a selection and combination module if the UE is in macrodiversity mode in the target SRNS. It subsequently returns an acknowledgement to the source RNC 40 (step 117) to indicate that the relocation has been achieved.

On receipt of this acknowledgement, the source RNC suppresses its MAC instance relating to the UE 14, and as appropriate its selection/combination module (step 104). If the acknowledgement is not received within a specified timescale, it can repeat the procedure of FIG. 9 or abandon the request for relocation.

The procedure of FIGS. 9 and 10 correctly aligns the ciphering process in the target RNC with that executed in the UE, provided that the timescale for routing the message from the source RNC to the target RNC does not exceed $(2^k+\delta) \times 10$ ms.

This condition is easy to fulfill. It is for example possible to take k=Q=12, this allowing timescales of up to at least 40 s. To do this, the offset communicated to the DRNC in the preparation for macrodiversity can be widened to Q bits. Alternatively, it is possible to provide the missing Q-P most significant bits with the value CSNE. The message of FIGS. 9 and 10 can then be the "Relocation_Required" message transmitted via the core network, the value CSNE and possibly the Q-P most significant bits of $\Delta_Q$ being placed in the field transmitted in a transparent manner to the RRC layer of the target RNC.

It is moreover possible to transmit the message of FIGS. 9 and 10 over the Iur interface. This interface is also asynchronous, but it generally allows shorter routing times since the core network need not process the messages. In this case, we can allow ourselves to reduce the number k, by taking for example k=P=8, thereby avoiding the need to modify the reporting messages sent back up by the UEs.

The procedure of FIGS. 9 and 10 is also advisable in the case of a relocation performed within the context of an HHO. This may occur in the diagrammatic configuration of FIG. 11 which is similar to that of FIG. 4 except that there is no Iur interface between the two RNCs involved 60, 61. It will be noted that there could be one such Iur interface, but not serving for handover, for example because the latter is between two different carrier frequencies. In another embodiment, the RNCs 60, 61 belong to different access networks (a UTRAN and a GERAN for example).

Figure 12:
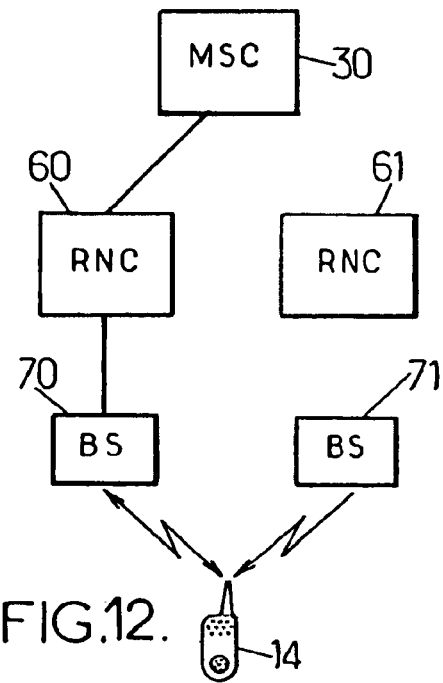
FIGS. 12 to 14 are diagrams of the network of FIG. 11 showing the links which are active at various instants of a communication.
Figure 13:
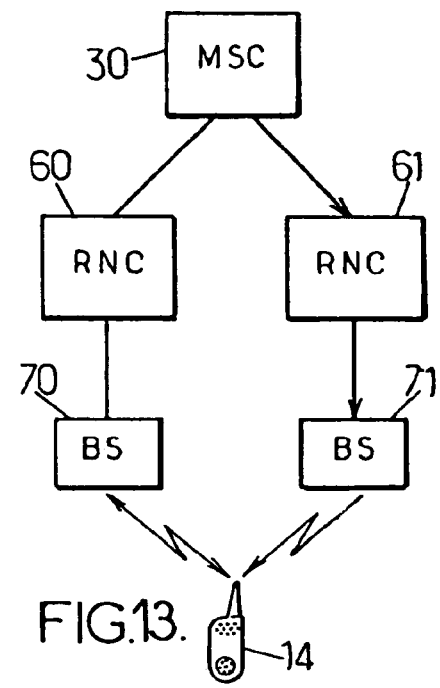
Figure 14:
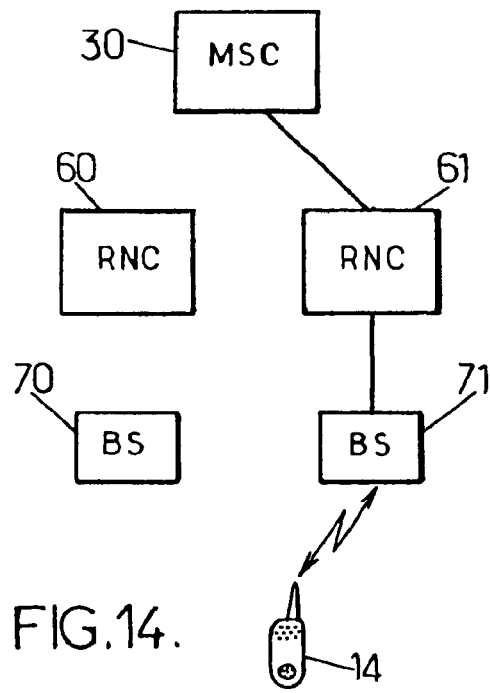

A typical scenario of HHO is illustrated by FIGS. 12 to 14 in the network configuration of FIG. 11. Initially (FIG. 12), a path is established in a conventional manner between the MSC 30 of the core network and the UE 14 through the source RNC 60 and the base station 70 dependent thereon. The UE performs the prescribed measurements on the common channels of its neighboring cells in particular the channels of the base station 71 linked to the RNC 61 in the situation illustrated by FIG. 12. When the analysis of these measurements shows that an HHO to the base station 71 is desirable, the SRNC 60 sends its MSC 30 an HHO request message ("Handover_Prepare") designating the target RNC 61.

When handover is triggered, a second path is established, beginning with the downlink (FIG. 13). The same information pertaining to the logical channel is transmitted twice from the MSC 30 (or several MSCs), once by way of the RNC 60 and of the base station 70 and once by way of the RNC 61 and of the base station 71. In the uplink, the terminal 14 keeps the parameters of the physical channel of the first path until it receives a "Handover_Command" message asking it to switch over to the other base station 71. On receipt of this message, the UE 14 executes the command, doing so once the synchronized network completes the establishing of the second path. The first path is then suppressed (FIG. 14).

In the situation illustrated by FIG. 13, the downlink information is ciphered on the two paths between the RNC and the UE. The MAC instance of the target RNC 61 has started its counter 23 with an initial value $CSN_0$ provided by the procedure of FIGS. 9 and 10. The values CSNE and $\Delta_k$ can be included by the source RNC 60 in the "Handover_Prepare" message and retransmitted by the core network to the target RNC 61. It is therefore necessary for the UE to have measured $\Delta_k$ and to have reported it to its SRNC. We shall preferably take k=Q=12.

As soon as it switches over to the base station 71, the UE has its CSN number synchronized without having had to modify it. It can therefore immediately receive the downlink information and transmit the uplink information with the correct ciphering. Once the base station 61 has acquired synchronization, the second path is completed.

In certain cases, the UE may have had a microdiversity phase between the source RNC and the target RNC on a first carrier frequency before performing an HHO with change of carrier to the target RNC. In such a case, the target RNC is already furnished with the offset $\Delta_k$ or $\Delta_P$, so that it is not mandatory to repeat it at the moment of the HHO.

It may also happen that another UE has had a macrodiversity phase between the source RNC (SRNC) and target RNC (DRNC). When the HHO procedure commences for the UE 14, the source RNC 60 can then determine the relevant value of the offset $\Delta_k$ without having necessarily received it from the UE 14: it deduces it from the CFN of the two UEs and from the offset measured and indicated by the other UE.

It should be noted that the controllers 60 and 61 operating in the manner described hereinabove with reference to FIGS. 11 to 14 could, according to an alternative embodiment of the invention, be two separate parts of an item of equipment situated at a given node of the network. This item of equipment may be of RNC type in the UMTS architecture, and the two separate parts may be circuits separately managing the two paths as regards at least the MAC layer, these circuits communicating with one another in an asynchronous manner. These circuits are for example carried by two different cards or contained in two different cabinets of the RNC.

It will also be noted that the procedure of FIGS. 9 and 10 can take various equivalent forms. Thus, rather than containing CSNE and $\Delta_k$ explicitly, the message or messages sent to the target RNC could contain any combination enabling the latter to retrieve these parameters.

For example, in a relocation following an SHO where the target RNC is already furnished with the offset $\Delta_P$, the message sent to the target RNC can contain the current value HFNE of the HFN and a number $SFNE_k$ represented by the k least significant bits of the current SFN of the target cell (P<k≦Q) i.e. $SFNE_k=(CSNE-\Delta_k)$ mod $2^k$. The target RNC can then operate as previously with $\Delta_k=(HFNE\times2^P-SFNE_k+\Delta_P)$ mod $2^k$ and $CSNE=(HFNE\times2^P+\Delta_P)$ mod $2^M$.

In another embodiment, advisable in particular in the case of the HHO, the message sent to the target RNC contains the current value CSNE of the CSN and the aforesaid number $SFNE_k$ (P<k≦Q). The target RNC can operate in the same manner with $\Delta_k=(CSNE-SFNE_k)$ mod $2^k$.

Moreover, the time reference available to the second RNC 41 or 61, with respect to which the offset $\Delta_k$ or any quantity related to this offset is expressed, could be different from the SFN of the target cell, for example:

the SFN of another base station linked to the target RNC, whose common control channel has been detected by the UE (or by another UE supervized by the source RNC), thereby allowing the measurement of the offset $\Delta_k$ relating to this other station. Since the target RNC knows the discrepancies between the SFNs of the base stations which it supervises, it can thus retrieve the correct value of $\Delta_k$;

the SFN of any base station, in particular that of the source cell, if the RNCs know the SFN offsets between the various cells, as is sometimes used for subscriber location services;

a time reference common to the RNCS, obtained for example by means of GPS-type receivers or the like picking up synchronized signals transmitted by a constellation of satellites.

In another embodiment of the invention, the source RNC explicitly transmits only a most significant part of the CSN, for example the HFN, compelling itself to do so when the remaining least significant part, namely the CFN, has a determined value known to the target RNC (for example 0), which amounts to providing this value implicitly. This manner of proceeding may be suitable in the case of a relocation following an SHO since the timescales for executing such a relocation are not critical.

We claim:

1. Method of controlling a circuit mode communication logical channel between a radio terminal and a cellular radiocommunication infrastructure, the infrastructure comprising at least one core network, radio network controllers linked to the core network and comprising first and second controllers, and base stations provided with radio interfaces and each linked to one of the radio network controllers, the method comprising the steps of:

establishing at least one first communication path between the core network and the terminal, passing through one of the base stations and through the first controller constituting a master controller for said first path;

transmitting information pertaining to the logical channel along the first communication path;

establishing at least one second communication path between the core network and the terminal, passing through one of the base stations and through the second controller constituting a master controller for said second path; and transmitting information pertaining to the logical channel along the second communication path, wherein the information transmitted along each communication path is ciphered in a portion of said path going from the master controller to the radio terminal, the ciphering being performed as a function of parameters comprising a secret key and a ciphering sequence number combined with said key, whereby the master controller and the terminal jointly increment the ciphering sequence number at the rate of frames of determined duration, so as to have the same ciphering parameters to allow deciphering of the information, and wherein the second path is established in a transfer procedure which comprises transmitting adjustment data from the first controller to the second controller and suppressing each first path, the adjustment data being representative of a current value of the ciphering sequence number and of an offset between the ciphering sequence number and a time reference available to the second controller.

2. Method according to claim 1, wherein the second controller processes the adjustment data received from the first controller to align the ciphering sequence number which it increments with that incremented autonomously by the radio terminal.

3. Method according to claim 1, wherein said offset is measured by the terminal on the basis of radio signals received from a base station linked to the second controller and carrying information relating to said time reference.

4. Method according to claim 3, wherein said time reference comprises a frame counter maintained for a base station linked to the second controller.

5. Method according to claim 1, wherein the transfer procedure comprises:

a phase of establishing at least one first additional path between the core network and the radio terminal, passing through a base station linked to the second controller and through the second controller in addition to the first controller constituting the master controller, during which some at least of the adjustment data representative of said offset are transmitted from the first controller to the second controller;

a macrodiversity phase during which information pertaining to the logical channel is transmitted simultaneously along at least two first communication paths including said first additional path; and a relocation phase during which the adjustment data representative of the current value of the ciphering sequence number are transmitted from the first controller to the second controller, after which each first path is replaced by a second path not passing through the first controller.

6. Method according to claim 5, wherein the relocation phase is performed after a phase of suppressing each first path not passing through the second controller.

7. Method according to claim 5, wherein the adjustment data are transmitted from the first controller to the second controller through an interface provided between the radio network controllers, without passing through the core network.

8. Method according to claim 7, wherein said offset is represented on P bits and said time reference is represented on Q bits, as expressed in terms of number of frames, whilst the ciphering sequence number is represented on M bits, M, P and Q being integers such that 0<P<Q<M.

9. Method according to claim 8, wherein the first controller transmits the adjustment data during the relocation phase at an instant at which the P least significant bits of the ciphering sequence number are zero.

10. Method according to claim 5, wherein the adjustment data transmitted during the phase of establishing the first additional path are transmitted through an interface provided between the radio network controllers, without passing through the core network, whilst the remainder of the adjustment data is transmitted during the relocation phase through the core network.

11. Method according to claim 10, wherein said offset and said time reference are represented on Q bits, as expressed in terms of number of frames, whilst the ciphering sequence number is represented on M bits, M and Q being integers such that 0<Q<M.

12. Method according to claim 1, wherein the first and second paths have radio links respectively supported by different access resources, and wherein the transfer procedure comprises:

sending the adjustment data from the first controller to the second controller once the terminal is within radio range of a base station of the second path, linked to the second controller;

a phase of simultaneous transmission of radio signals transporting the same information ciphered by the respective base stations of the first and second paths;

switching over the terminal from the radio link of the first path to the radio link of the second path; and suppressing the first path, the terminal transmitting and receiving the ciphered information along the second path.

13. Method according to claim 12, wherein the adjustment data are transmitted from the first controller to the second controller through the core network.

14. Method according to claim 13, wherein said offset and said time reference are represented on Q bits, as expressed in terms of number of frames, whilst the ciphering sequence number is represented on M bits, M and Q being integers such that 0<Q<M.

15. Method according to claim 12, wherein the different access resources of the radio links of the first and second paths comprise different carrier frequencies.

16. Method according to claim 12, wherein the first and second controllers belong to different access networks.

17. Method according to claim 12, wherein the first and second controllers are situated at a common network node, and comprise separate circuits in relation to the first and second paths, for at least some of the communication protocols including the information ciphering and deciphering functions, whereby said circuits communicate with one another asynchronously.

18. Access network of a cellular radiocommunication infrastructure, comprising:

radio network controllers linked to a core network of said infrastructure and including first and second radio network controllers;

base stations provided with radio interfaces and each linked to one of the radio network controllers;

means for establishing at least one first communication path between the core network and a radio the terminal, passing through one of the base stations and through the first controller constituting a master controller for said first path;

means for transmitting information pertaining to a logical channel along the first communication path;

means for establishing at least one second communication path between the core network and the terminal, passing through one of the base stations and through the second controller constituting a master controller for said second path; and means for transmitting information pertaining to the logical channel along the second communication path, wherein the information transmitted along each communication path is ciphered in a portion of said path going from the master controller to the radio terminal, the ciphering being performed as a function of parameters comprising a secret key and a ciphering sequence number combined with said key, whereby the master controller and the terminal jointly increment the ciphering sequence number at the rate of frames of determined duration, so as to have the same ciphering parameters to allow deciphering of the information, and wherein the means for establishing the second communication path second path are responsive to a transfer procedure which comprises transmitting adjustment data from the first controller to the second controller and suppressing each first path, the adjustment data being representative of a current value of the ciphering sequence number and of an offset between the ciphering sequence number and a time reference available to the second controller.

19. Access network according to claim 18, wherein the second controller comprises means for processing the adjustment data received from the first controller to align the ciphering sequence number which it increments with that incremented autonomously by the radio terminal.

20. Access network according to claim 18, further comprising:

means for performing a phase of establishing at least one first additional path between the core network and the radio terminal in the transfer procedure, whereby said first additional path passes through a base station linked to the second controller and through the second controller in addition to the first controller constituting the master controller, and whereby some at least of the adjustment data representative of said offset are transmitted from the first controller to the second controller in said phase of establishing at least one first additional path;

means for performing a macrodiversity phase in the transfer procedure, during which information pertaining to the logical channel is transmitted simultaneously along at least two first communication paths including said first additional path; and means for performing a relocation phase in the transfer procedure, during which the adjustment data representative of the current value of the ciphering sequence number are transmitted from the first controller to the second controller, after which each first path is replaced by a second path not passing through the first controller.

21. Access network according to claim 20, further comprising means for performing a phase of suppressing each first path not passing through the second controller before the relocation phase.

22. Access network according to claim 20, wherein the adjustment data are transmitted from the first controller to the second controller through an interface provided between the radio network controllers, without passing through the core network.

23. Access network according to claim 22, wherein said offset is represented on P bits and said time reference is represented on Q bits, as expressed in terms of number of frames, whilst the ciphering sequence number is represented on M bits, M, P and Q being integers such that 0<P<Q<M.

24. Access network according to claim 23, wherein the first controller transmits the adjustment data during the relocation phase at an instant at which the P least significant bits of the ciphering sequence number are zero.

25. Access network according to claim 20, wherein the adjustment data transmitted during the phase of establishing the first additional path are transmitted through an interface provided between the radio network controllers, without passing through the core network, whilst the remainder of the adjustment data is transmitted during the relocation phase through the core network.

26. Access network according to claim 25, wherein said offset and said time reference are represented on Q bits, as expressed in terms of number of frames, whilst the ciphering sequence number is represented on M bits, M and Q being integers such that 0<Q<M.

27. Access network according to claim 18, wherein the first and second paths have radio links respectively supported by different access resources, and further comprising:

means for sending the adjustment data from the first controller to the second controller in the transfer procedure, once the terminal is within radio range of a base station of the second path, linked to the second controller;

means for performing a phase of simultaneous transmission of radio signals transporting the same information ciphered by the respective base stations of the first and second paths;

means for suppressing the first path upon switching over of the terminal from the radio link of the first path to the radio link of the second path, whereupon the terminal transmits and receives the ciphered information along the second path.

28. Access network according to claim 27, wherein the adjustment data are transmitted from the first controller to the second controller through the core network.

29. Access network according to claim 28, wherein said offset and said time reference are represented on Q bits, as expressed in terms of number of frames, whilst the ciphering sequence number is represented on M bits, M and Q being integers such that 0<Q<M.

30. Access network according to claim 27, wherein the different access resources of the radio links of the first and second paths comprise different carrier frequencies.

31. Access network according to claim 27, wherein the first and second controllers are situated at a common network node, and comprise separate circuits in relation to the first and second paths, for at least some of the communication protocols including the information ciphering and deciphering functions, whereby said circuits communicate with one another asynchronously.

* * * * *